(12) United States Patent
Yu et al.

(10) Patent No.: US 6,345,345 B1
(45) Date of Patent: Feb. 5, 2002

(54) DATA COMMUNICATIONS DEVICE AND ASSOCIATED METHOD FOR ARBITRATING ACCESS USING DYNAMICALLY PROGRAMMABLE ARBITRATION SCHEME AND LIMITS ON DATA TRANSFERS

(75) Inventors: Ching Yu, Santa Clara; Jerry Kuo, San Jose, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/236,586

(22) Filed: Jan. 26, 1999

(51) Int. Cl.$^7$ .................... G06F 13/14; G06F 13/36
(52) U.S. Cl. .................. 711/151; 711/158; 710/34; 710/39; 710/41; 710/116; 710/129
(58) Field of Search ................. 711/150, 151, 711/158, 168; 710/34, 39, 40, 41, 52, 53, 112, 116, 123, 129, 130

(56) References Cited

U.S. PATENT DOCUMENTS

| | | | | |
|---|---|---|---|---|
| 4,875,206 A | * | 10/1989 | Nichols et al. | 370/427 |
| 5,619,651 A | * | 4/1997 | Young | 709/250 |
| 5,799,209 A | * | 8/1998 | Chatter | 710/56 |
| 5,818,844 A | * | 10/1998 | Singh et al. | 370/463 |
| 5,881,316 A | * | 3/1999 | Chaney et al. | 710/56 |
| 5,903,283 A | * | 5/1999 | Selwan et al. | 345/521 |
| 5,949,789 A | * | 9/1999 | Davis et al. | 370/452 |
| 6,061,767 A | * | 5/2000 | Kuo et al. | 711/156 |
| 6,061,768 A | * | 5/2000 | Kuo et al. | 711/156 |
| 6,067,408 A | * | 5/2000 | Runaldue et al. | 710/127 |

* cited by examiner

Primary Examiner—Glenn Gossage

(57) ABSTRACT

Data communications device and method for arbitrating access to a system memory of the communications device via a peripheral component interconnect (PCI) bus in a network interface having a memory management unit for managing transmit data transfers from the system memory to a transmit buffer memory, and receive data transfers from a receive buffer memory to the system memory. The memory management unit includes an arbitration block having an arbiter state machine, which receives requests for access to the PCI bus in order to provide the transmission and reception of data, descriptors and status information. The arbiter state machine grants the PCI bus access to a request having a higher priority in accordance with a preset priority scheme. The memory management unit has a transmit transfer control register and a receive transfer control register containing programmable values that limit the maximum number of transmit data transfers and receive data transfers allowed within a single PCI bus mastership period. Also, the transmit and receive transfer control registers contain programmable values that limit the number of allowed transmit data transfers within a single PCI bus mastership period when a request for a receive data transfer is asserted, and limit the number of allowed receive data transfers in a PCI bus mastership period when a request for a transmit data transfer is active. The transfer control values in the transmit and receive transfer control registers are dynamically programmed by a host based on data traffic in the PCI bus. Also, the transmit and receive transfer control register values may be preprogrammed based on the network interface application, for example, whether the network interface is used in a network client or network file server.

24 Claims, 5 Drawing Sheets

US 6,345,345 B1

DATA COMMUNICATIONS DEVICE AND ASSOCIATED METHOD FOR ARBITRATING ACCESS USING DYNAMICALLY PROGRAMMABLE ARBITRATION SCHEME AND LIMITS ON DATA TRANSFERS

FIELD OF THE INVENTION

The present invention relates to data communications, and more particularly, to a system for arbitrating access to a system memory.

BACKGROUND ART

In a data communications device, buffer memories are provided between a system memory interface and a media interface for temporarily storing data transferred between a system memory and a communications network. In particular, a receive buffer memory accumulates receive data supplied from the network, before transferring the data to the system memory, whereas a transmit buffer memory is involved in transferring transmit data from the system memory to the network.

Conventionally, the receive buffer memory accesses the system memory to transfer receive data, when amount of accumulated receive data exceeds a threshold value established to handle data traffic. The transmit buffer memory accesses the system memory to retrieve transmit data, when available buffer capacity exceeds a threshold level sufficient for holding the transmit data. However, the receive and transmit buffer memories may request access to the system memory at the same time. As a result, a collision may occur.

Thus, it would be desirable to provide a system for performing arbitration between receive and transmit buffer memories requesting access to a system memory at the same time.

Also, it would be desirable to dynamically program the arbitration system in accordance with data traffic conditions, in order to make a communications system more efficient.

SUMMARY OF THE INVENTION

Accordingly, the advantage of the present invention is in providing a system for arbitrating between receive and transmit buffer memories requesting access to a system memory.

Another advantage of the present invention is in providing an arbitration system which may be dynamically programmed in accordance with data traffic conditions.

These and other advantages of the present invention are achieved at least in part by providing a data communications device coupled to a system memory and having a receive buffer memory for temporarily storing receive data supplied from a communications network, and a transmit buffer memory for temporarily storing transmit data retrieved from the system memory. A memory management circuit is coupled to the receive and transmit buffer memories for managing transmit data transfers from the system memory to the transmit buffer memory and receive data transfers from the receive buffer memory to the system memory. An arbitration circuit is provided for arbitrating access to the system memory in response to access requests.

In accordance with one aspect of the present invention, the memory management circuit may comprise a transmit transfer control register having transmit data transfer control values for limiting the number of the transmit data transfers in each period of access to the system memory granted by the arbitration circuit. The transmit data transfer control values may be dynamically programmed in accordance with data traffic. Alternatively, the transmit data transfer control values may be preprogrammed in accordance with application of the communications device, for example, depending on whether the device is a network client or a file server.

The transmit data transfer control values may include a transmit transfer maximum value that limits the maximum number of transmit data transfers in one period of access to the system memory. Also, the transmit data transfer control values may include a transmit transfer limit value that limits the number of transmit data transfers in one period of access to the system memory, when access to the system memory is also requested for providing receive data transfers.

In accordance with another aspect of the invention, the memory management circuit may comprise a receive transfer control register having receive data transfer control values for limiting the number of the receive data transfers in one period of access to the system memory granted by the arbitration circuit. The receive data transfer control values may be dynamically programmed in accordance with data traffic, or may be preprogrammed in accordance with application of the communications device.

The receive data transfer control values may include a receive transfer maximum value that limits the maximum number of receive data transfers in one period of access to the system memory. Also, the receive data transfer control values may include a receive transfer limit value that limits the number of transmit data transfers in one period of access to the system memory, when access to the system memory is also requested for providing the transmit data transfers.

In accordance with a preferred embodiment of the invention, the system memory may be coupled to the receive and transmit buffer memories via a bus, such as a peripheral component interconnect (PCI) bus. The arbitration circuit arbitrates access to the bus.

In accordance with a further aspect of the invention, the access requests supplied to the arbitration circuit include a transmit data request to read transmit data from the system memory to the transmit buffer memory, a receive data request to write receive data from the receive buffer memory to the system memory, a receive descriptor request to read a receive descriptor from the system memory, a transmit descriptor request to read a transmit descriptor from the system memory, a receive status request and a transmit status request to write receive status information and transmit status information, respectively, to the system memory.

In accordance with another aspect of the invention, the receive descriptor request has the highest priority when tile arbitration circuit provides access arbitration. File transmit descriptor request has the next priority after the receive descriptor request.

In accordance with a further aspect of the invention, the receive data request may have priority over the transmit data request when the arbitration circuit provides access arbitration immediately after reset of the communications device.

During normal operations, the transmit data request may have priority over the receive data request if the last access to the system memory before performing access arbitration was provided to write the receive data. However, the receive data request may have priority over the transmit data request if the last access to the system memory was performed to read the transmit data.

In accordance with a method of the present invention the following steps are carried out to arbitrate access to a bus between a system memory and transmit and receive buffer memories:

providing a transmit data request to access the bus for reading transmit data from the system memory to the transmit buffer memory, providing a receive data request to access the bus for writing receive data from tile receive buffer memory to the system memory, and providing arbitration between the transmit data request and the receive data request in accordance with a priority scheme.

Further, the method of the present invention may include a step of programming transmit transfer control values for limiting number of transmit data transfers allowed in one period of access to the bus, and a step of programming receive transfer control values for limiting number of receive data transfers allowed in one period of access to the bus.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING-OUT THE INVENTION

Although the invention has general applicability in the field of data processing, the best mode for practicing the invention is based in part on the realization of a network interface in a packet switched network, Such as an Ethernet (IEEE 802.3) network.

Figure 1A:
FIGS. 1A and 1B show a block diagram of an exemplary network interface, in which the present invention may be implemented.
Figure 1A:
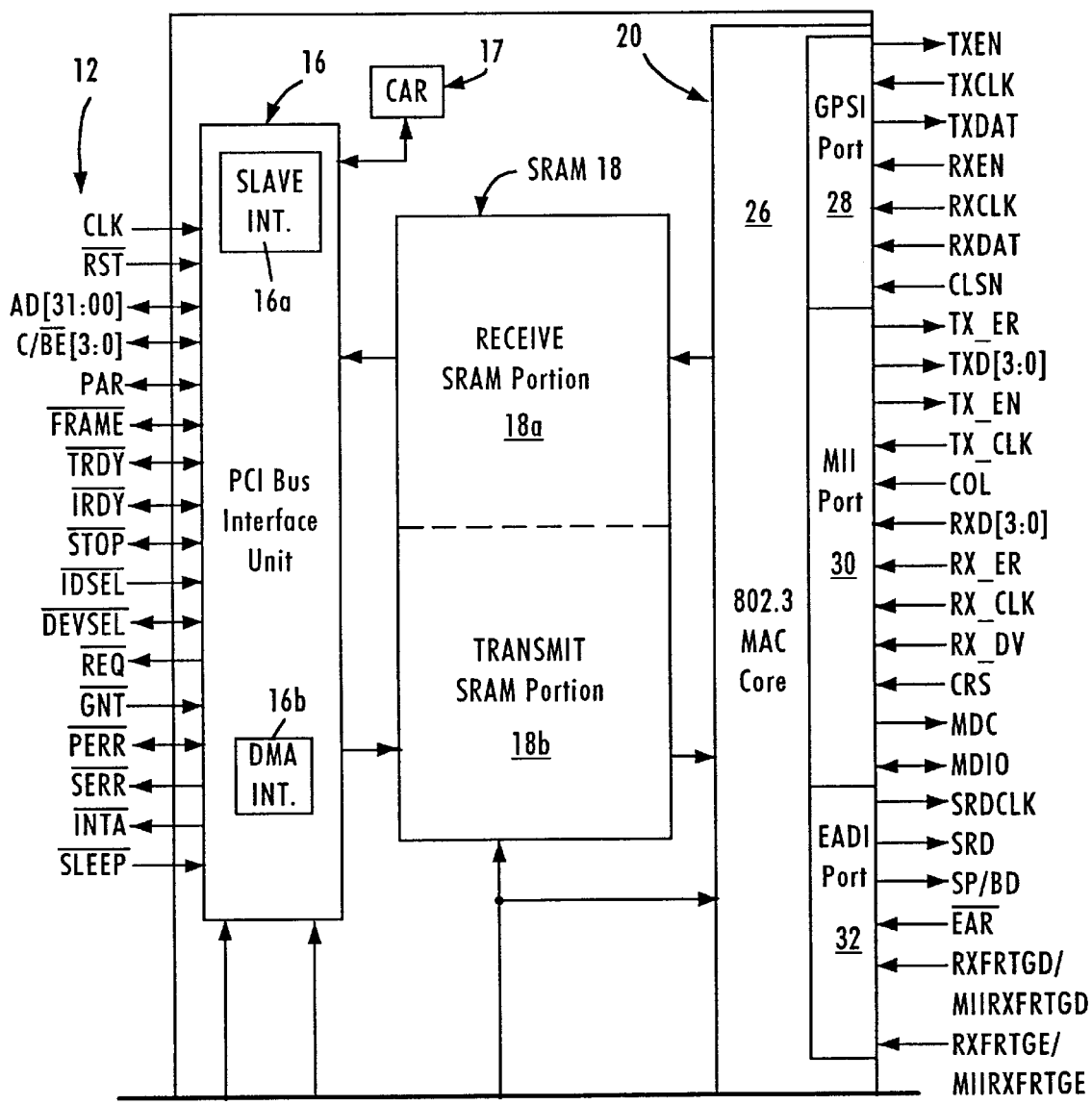
Figure 1B:
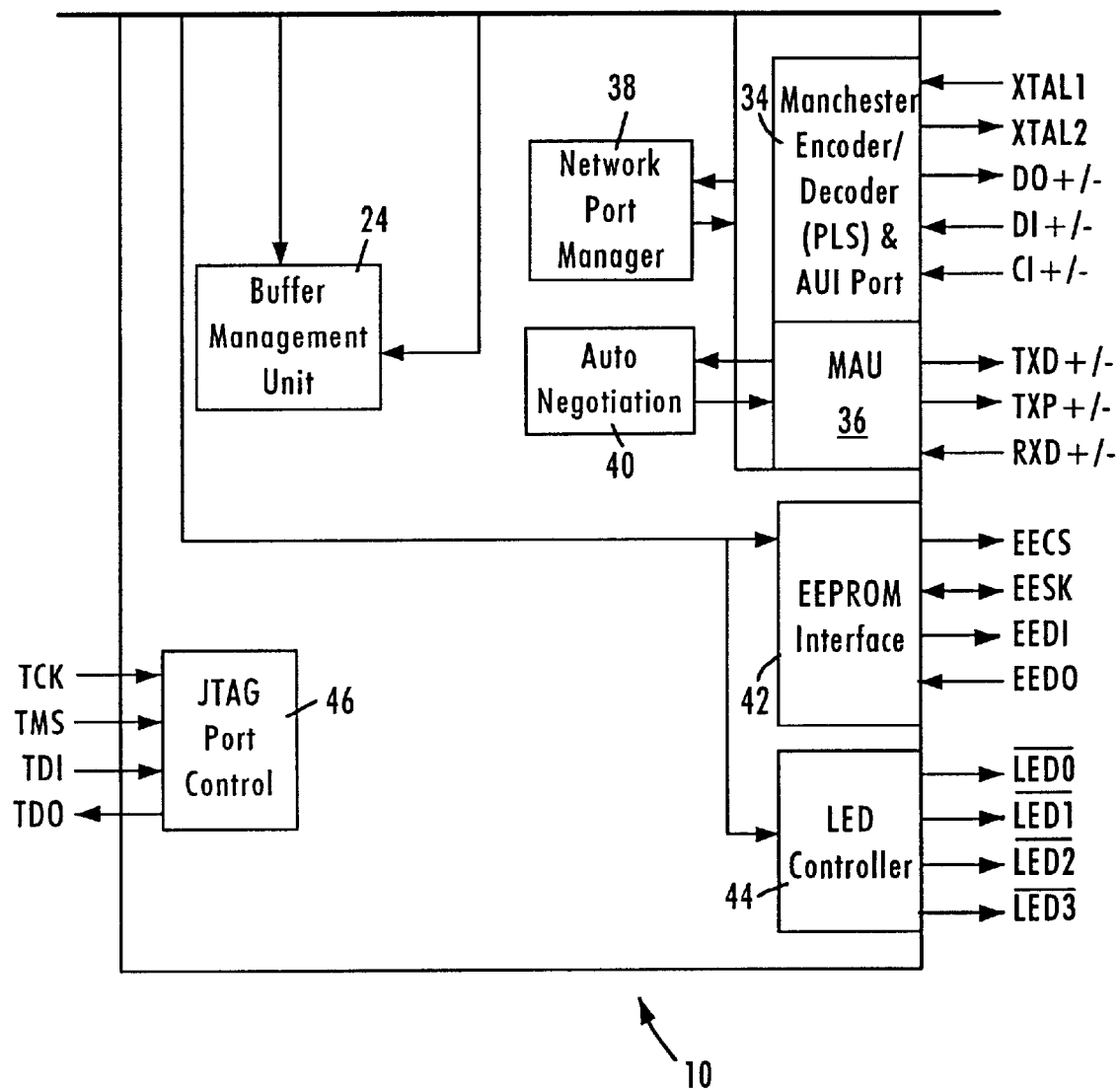

FIG. 1 is a block diagram of an exemplary duty communications device such as a network interface 10 that accesses the media of an Ethernet (ANSI/IEEE 802.3) network. The network interface 10, preferably, a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit (BIU) 16, a buffer memory portion 18, and a network interface portion 20. The PCI bus interface unit 16 may provide an interface with an external central processing unit (CPU) or other host via the PCI local bus. The PCI bus interface unit 16 may include a PCI slave interface 16a and a direct memory access (DMA) interface 16b. The slave interface 16a manages PCI control and status information including reading and programming of the PCI status registers, and is configured for managing slave transfers via the PCI bus with a host CPU. The DMA interface 16b manages DMA transfers by the network interface 10 to and from a system memory coupled to the PCI bus 12. Hence, the PCI bus interface unit 16 can be selectively configured for PCI transfers in slave and/or master (e.g., DMA) mode. In accordance with the PCI local bus specification, revision 2.1, the PCI bus interface unit 16 has a 32-bit address/data bus AD[31:0] for providing address and data transfers.

A control and register (CAR) block 17 is interfaced to the PCI bus interface 16 to allow read and write accesses to various registers in the network interface 10. As discussed in more detail later, the CAR block 17 contains a command register which produces command signals sent to other blocks of the interface 10 . Also, the CAR block 17 comprises registers accessible by the host CPU for read and write operations through the PCI bus interface 16.

The memory portion 18 includes a 16-bit SRAM 18 implemented directly on the network interface chip 10. According to the disclosed embodiment, the SRAM 18 may be segmented into a receive SRAM portion 18a and a transmit SRAM portion 18b for receive and transmit paths, respectively.

The network interface 10 also includes a memory management unit (MMU) 24 controlling all transfers of data to and from the memory unit 18. The MMU 24 may be configured for managing DMA transfers via the DMA interface 16b. DMA transfers are managed based on DMA descriptors that specify start address, length, etc. The MMU 24 initiates a DMA read from the system memory into the transmit SRAM 18b by issuing an instruction to the DMA interface 16b, which translates instructions into PCI bus cycles. Also, the MMU 24 handles DMA data transfers from the receive SRAM 18a to the system memory via the PCI bus 12. Hence, the MMLJ 24 contains descriptor management for DMA transfers, as well as pointers associated with storing and reading data from the memory buffer portion 18.

The network interface portion 20 includes a media access control (MAC) core 26, a general purpose serial interface (GPSI) 28, a media independent interface (MII) 30 for connecting to an external 10 Mb/s or 100 Mb/s physical transceiver (PHY), an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII poll 30. Such MII handshaking is performed in accordance with the IEEE 802.3 protocols, and may include link and programming information exchange at the MII layer using a management data clock (MDC), and management data input/output (MDIO) paths defined in the IEEE 802.3 standard.

The auto-negotiation portion 40 performs IEEE-compliant negotiation with a link partner on the PHY layer to exchange data indicating whether the link partner is capable of operating at 10 Mb/s. 100 Mb/s, and whether the link should be half-duplex or full-duplex.

The electrically erasable programmable read only memory (EEPROM) interface 42 connects to an EEPROM on either a network interface adapter card or the motherboard of the host computer via a serial interface link. The EEPROM (not shown in FIG. 1) may be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down.

The LED controller 44 selectively controls the generation of LED output signals based upon the internal decoding logic and network interface status registers (not shown).

Figure 2:
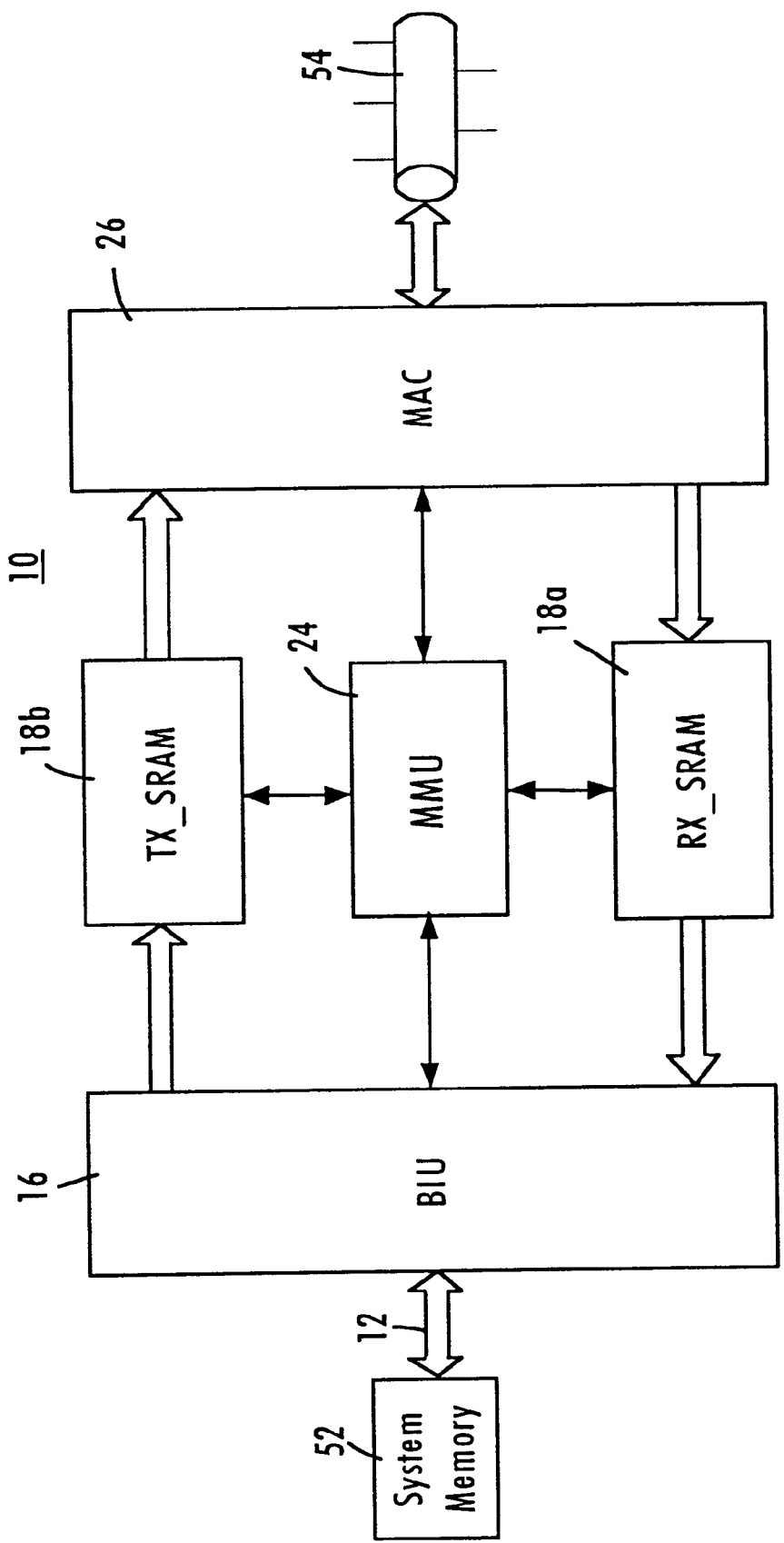

FIG. 2 schematically shows the arrangement of the memory management unit (MMU) 24 in the network interface 10. The MMU 24 is coupled between the bus interface unit (BIU) 16 and the MAC core 26, and is connected to the receive SRAM portion 18a and the transmit SRAM 18b. A system memory 52 may be coupled to the BIU 16 via the PCI bus 12. The MAC core 26 provides interface to a network 54, such as an Ethernet local area network. To support data transmission to the network 54, the MMU 24 manages the flow of transmit data from the system memory 52 via the BIU 16 to the transmit SRAM portion 18b, and from the transmit SRAM portion 18b to the MAC core 26. To provide the reception of data from the network 54, the MMU 24 handles the flow of receive data from the network 54 via the MAC core 26 to the receive SRAM portion 18a, and from the receive SRAM portion 18a to the system memory 52, via the BIU 16.

Figure 3:
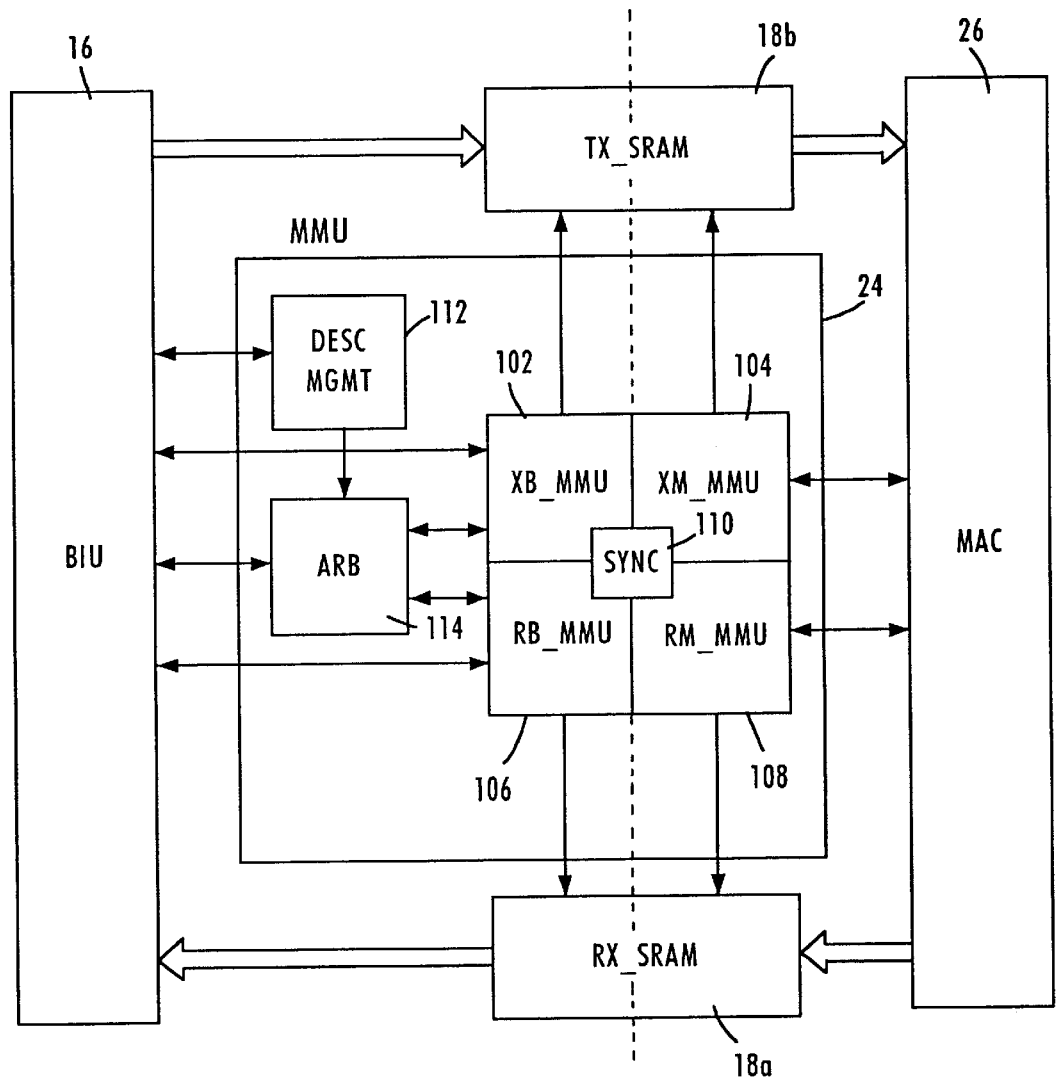

Referring to FIG. 3, the MMU 24 may comprise a bus transmission block (XB_MMU) 102, a MAC transmission block (XM_MMU) 104, a bus reception block (RB_MMU) 106, a MAC reception block (RM_MMU) 108, a synchronizing block (SYNC) 110, a descriptor management block 112, and an arbitration block 114. The bus transmission block 102 manages DMA transfers of transmit data from the BIU 16 to the transmit SRAM portion 18b to support data transmission from the system memory 52 to network 54. The MAC transmission block 104 handles data transfers from the transmit SRAM portion 18b to the MAC core 26, which transmits data to the network 54.

The MAC reception block 108 controls transfers of receive data from the MAC core 26 to the receive SRAM portion 18a to provide data reception from the network 54. The bus reception block 106 manages DMA data transfers from the receive SRAM portion 18a to the BIU 16, to place received data to the system memory 52.

The synchronizing block 110 is used to synchronize activities of blocks 102, 104, 106 and 108. The descriptor management block 112 manages the transmission and reception of descriptor lists and status lists. Finally, the arbitration block 114 arbitrates DMA requests for data transmission, data reception, descriptor lists and status. The network interface 10 acts as a PCI bus master when the system in memory 52 is accessed. Thus, the arbitration block 114 provides arbitration between various requests to access the PCI bus 12 in order to perform a required system memory operation.

Figure 4:
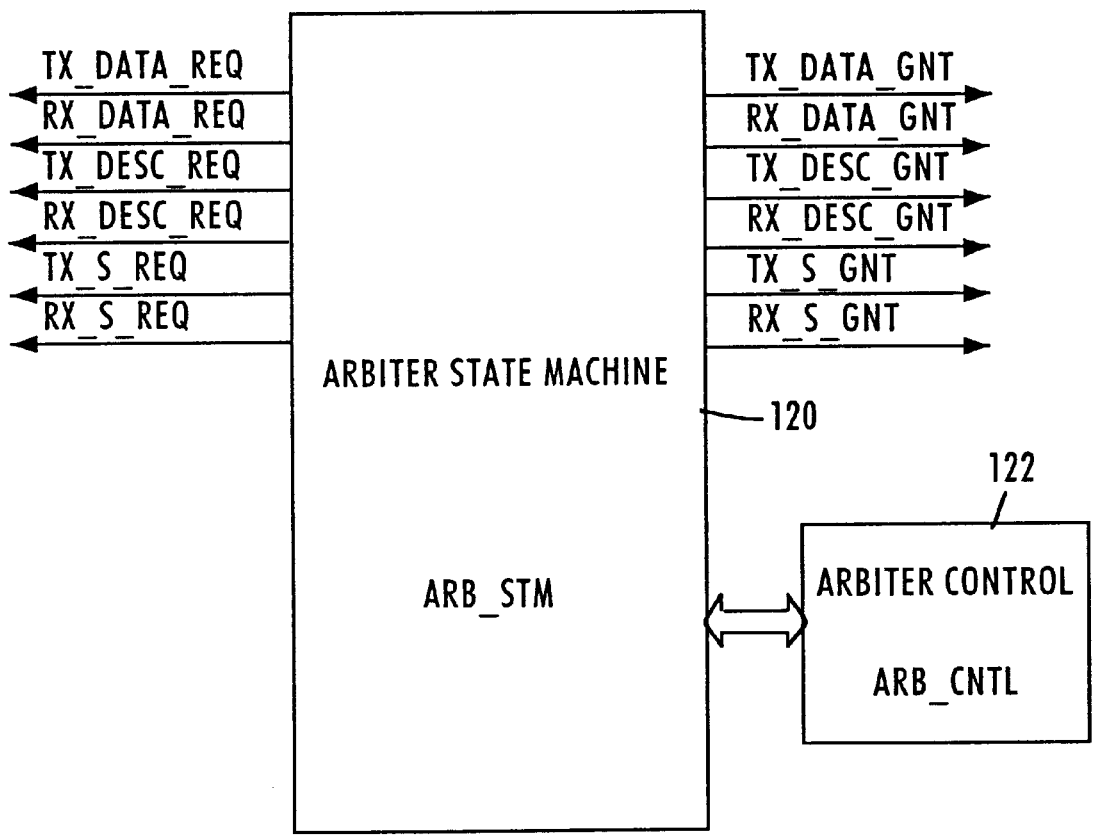

Referring to FIG. 4, the arbitration block 114 comprises an arbiter state machine 120 and an arbiter control unit 122. The arbiter state machine 120 receives request signals requesting access to the PCI bus 12 to perform write or read transfer operations to or from the system memory 52. In response to the request signals, the arbiter state machine 120 produces grant signals to allow only one requesting entity to access the system memory 52 at any given time period. The arbiter control unit 122 controls the arbiter state machine operations.

The PCI bus 12 may be used to provide transfers of data, descriptors or status information between the network interface 10 and the system memory 52. In particular, the PCI bus 12 may supply receive data from the receive SRAM portion 18a to the system memory 52, and read transmit data from the system memory 52 to the transmit SRAM portion 18b. Further, the PCI bus 12 may be used for fetching a transmit and receive status information to the system memory 52.

For example, the transmit descriptor may indicate a start address of transmit data in the system memory 52, length of transmit data and control information required by the MMU 24 handling transmit data. The receive descriptor may indicate an address buffer in the system memory 52 to be used for writing receive data, the length of the buffer and control information for managing receive data. Once a transmit or receive descriptor is used by the MMU 24, transmit or receive status information is written to the system memory 52 to return ownership of the corresponding descriptor to the host.

To prevent collisions between various requests for PCI bus access, the arbitration block 114 arbitrates between requests representing the transmission and reception of data, descriptor and status information. In particular, the arbiter state machine 120 receives a transmit data request signal TX_DATA_REQ that requests to read transmit data from the system memory 52, and a receive data request signal RX_DATA_REQ that requests to write receive data to the system memory 52. Also, the arbiter state machine 120 receives a transmit descriptor request signal TX_DESC_REQ and a receive descriptor request signal RX_DESC_REQ that respectively request reading transmit and receive descriptors from the system memory 52. A transmit status request signal TX_S_REQ and a receive status request signal RX_S_REQ are supplied to the arbiter state machine 120 to request writing transmit and receive status information, respectively, to the system memory 52. For example, the request signals may be supplied from the descriptor management block 112.

If the request signals are supplied at the same time, the arbitration block 114 performs arbitration between them in accordance with a preset priority scheme, and grants access to the PCI bus 12 only to one request signal. When the PCI bus access is granted, the arbitration block 114 produces a grant signal that allows the requested system memory operation to be performed. For example, when the PCI bus access is granted in response to the T_DATA_REQ signal, the arbiter state machine 120 issues a transmit data grant signal TX_DATA_GNT sent to the XB_MMU 102 to enable reading transmit data from the system memory 52. A receive data grant signal RX_DATA_GNT is issued in response to the RX_DATA_REQ signal to allow the RB_MMU 106 to write receive data to the system memory 52. In response to the TX_DESC_REQ and RX_DESC_REQ signals, transmit and receive descriptor grant signals TX_DESC_GNT and RX_DESC_GNT, respectively, are produced to enable fetching transmit and receive descriptors from the system memory 52. Finally, in response to the TX_S_REQ and RX_S_REQ signals, transmit and receive status grant signals TX_S_GNT and RS_S_GNT, respectively, are issued to allow transmit and receive status information to be written to the system memory 52.

The arbitration block 114 makes a decision to grant any of the requests based on priority assigned to the request signals. For example, if multiple requests are active simultaneously, the highest priority may be given to the RX_DESC_REQ signal requesting access to the PCI bus 12 to read a receive descriptor from the system memory 52, in order to support a data receive operation. The second priority may be assigned to the TX_DESC_REQ signal requesting PCI bus access to fetch a transmit descriptor from the system memory 52, for supporting a data transmit operation.

Immediately after reset of the network interface 10, the RX_DATA_REQ signal may have priority over the TX_DATA_REQ signal. Such a priority arrangement makes network interface operations more efficient because the MMU 24 is enabled to get access to the PCI bus for writing receive data to the system memory 52, before reading transmit data from the system memory 52.

In normal operations, when the RX_DATA_REQ and TX_DATA_REQ request signals are active at the same time, priority may be given to a request for a PCI operation that was not performed last. For example, if the RX_DATA_REQ and TX_DATA_REQ signals are active simultaneously and the last PCI bus access before the access arbitration was performed for writing receive data to the system memory 52, the TX_DATA_REQ signal may have priority over the RX_DATA_REQ signal. However, if the last PCI bus access was performed for reading transmit data from the system memory 52, the RX_DATA_REQ signal will have priority over the TX_DATA_REQ signal.

If a complete buffer in the system memory 52 is read when transmit data is being fetched from the system memory 52, the arbitration block 114 waits for the TX_S_REQ signal and gives priority to this signal over any other request. Similarly, if a complete buffer in the system memory 52 is full when receive data is being written to the system memory 52, the arbitration block 114 waits for the RX_S_REQ signal and gives priority to this signal over any other request.

The MMU 24 may comprise transmit and receive transfer control registers containing transmit and receive transfer control values that limit the maximum number of bytes allowed to be transferred to or from the system memory within a single PCI bus mastership period when the arbitration block 114 grants PCI bus access to the RX_DATA_REQ signal or TX_DATA_REQ signal.

The transmit transfer control register may contain a transmit transfer maximum value TX_MAX_XFR and a transmit transfer limit value TX_XFR_RX_WAIT. The TX_MAX—XFR value limits the number of transmit data transfers which may be executed by the network interface 10 within a single PCI bus mastership period, when transmit data are being read from the system memory 52. For example, each transmit data transfer may contain one double word equal to 4 bytes.

If the number of transmit data transfers required during one PCI bus access granted by the arbitration block 114 is greater than the TX_MAX_XFR value, the number of transmit data transfers allowed for the network interface 10 is equal to the TX_MAX_XFR value. If the number of required transmit data transfers is less than or equal to the TX_MAX_XFR value, tile network interface 10 carries out all of the required transmit data transfers.

The TX_XFR_RX_WAIT value limits the number of transmit data transfers which may be carried out by the network interface 10 within a single PCI bus mastership period, if receive data DMA unit is waiting for access to the system memory 52. Thus, the TX_XFR_RX_WAIT value limits the number of transmit data transfers, when the RX_DATA_REQ signal requesting receive data transfer is asserted simultaneously with the TX_DATA_REQ signal requesting transmit data transfer.

As discussed above, when the RX_DATA_REQ and TX_DATA_REQ signals are active at the same time, the arbitration block 114 grants PCI bus access to one of these requests based on a preset priority scheme. If the request for transmit data transfer has priority over the request for receive data transfer, the allowed number of transmit data transfers within a single PCI bus mastership period is limited to the TX_XFR_RX_WAIT value. As a result, a waiting period for receive data may be controlled to prevent the overflow of the receive SRAM 18a.

The TX_MAX_XFR and TX_XFR_RX_WAIT may be dynamically programmed by the CPU in accordance with the current data traffic via the PCI bus. The CPU may monitor the data traffic to change the TX_MAX_XFR and TX_XFR_RX_WAIT values so as to optimize the ratio between a time interval allocated for data transmission and a time interval allocated for data reception.

The maximum number of transmit data transfers allowed within a single PCI bus mastership period is limited by the smaller of the programmed values TX_MAX_XFR and TX_XFR_RX_WAIT.

The receive transfer control register may contain a receive transfer maximum value RX_MAX_XFR and a receive transfer limit value RX_XFR_TX_WAIT. The RX_MAX_XFR value limits the number of receive data transfers which may be executed by the network interface 10 within a single PCI bus mastership period, when receive data are being written to the system memory 52. For example, each receive data transfer may contain one double word equal to 4 bytes.

If the number of receive data transfers required during one PCI bus access granted by the arbitration block 114 is greater than the RX_MAX_XFR value, the number of receive data transfers allowed for the network interface 10 is equal to the RX_MAX_XFR value. If the number of required transmit data transfers is less than or equal to the RX_MAX_XFR value, the network interface 10 carries out all of the required receive data transfers.

The RX_XFR_TX_WAIT value limits the number of transmit data transfers which may be carried out by the network interface 10 within a single PCI bus mastership period, if transmit data DMA unit is waiting for access to the system memory 52. Thus, the RX_XFR_TX_WAIT value limits the number of receive data transfers, when the RX_DATA_REQ signal requesting receive data transfer is asserted simultaneously with the TX_DATA_REQ signal requesting transmit data transfer.

When the RX_DATA_REQ and TX_DATA_REQ signals are active at the same time, the arbitration block 114 grants PCI bus access to one of these requests based on a preset priority scheme. If the request for receive data transfer has priority over the request for transmit data transfer, the allowed number of receive data transfers is limited to the RX_XFR_TX_WAIT value. As a result, a waiting period for transmit data may be controlled.

The RX_MAX_XFR and RX_XFR_TX_WAIT may be dynamically programmed by the CPU in accordance with the current data traffic. The maximum number of receive data transfers allowed within a single PCI bus mastership period is limited by the smaller of the programmed values RX_MAX_XFR and RX_XFR_TX_WAIT.

The transfer control values in the transmit and receive transfer control registers may be programmed based on the application of the network interface 10. For example, if the network interface 10 is used in a file server, a time interval allocated for data transmission should substantially exceed a time interval allocated for data reception. Therefore, the transfer control values in the transmit and receive transfer control registers may be programmed so as to make the maximum allowed number of transmit data transfers within a single PCI bus mastership period substantially greater than the maximum allowed number of receive data transfers in a PCI bus mastership period.

By contrast, if the network interface 10 is used in a network client, a time interval allocated for data reception should be substantially greater than a time interval allocated for data transmission. Thus, the CPU may program the transfer control values in the transmit and receive transfer control registers so as to increase the maximum allowed number of receive data transfers within a single PCI bus mastership period, and reduce the maximum allowed number of transmit data transfers within a PCI bus mastership period.

There accordingly has been described a system for arbitrating access to a system memory via a PCI bus in a network interface having a memory management unit for managing transmit data transfers from the system memory to a transmit buffer memory, and receive data transfers from a receive buffer memory to the system memory. The memory management unit includes an arbitration block having an arbiter state machine, which receives requests for access to the PCI bus in order to provide the transmission and reception of data, descriptors and status information. The arbiter state machine grants PCI bus access to a request having a higher priority in accordance with a preset priority scheme. The memory management unit has a transmit transfer control register and a receive transfer control register containing programmable values that limit the maximum number of transmit data transfers and receive data transfers allowed within a single PCI bus mastership period. Also, the transmit and receive transfer control registers contain programmable values that limit the number of allowed transmit data transfers within a single PCI bus mastership period when a request for a receive data transfer is asserted, and limit the number of allowed receive data transfers in a PCI bus mastership period when a request for a transmit data transfer is active. The transfer control values in the transmit and receive transfer control registers are dynamically programmed by a host based on data traffic in the PCI bus. Also, the transmit and receive transfer control register values may be preprogrammed based on tile network interface application, for example, whether the network interface is used in a network client or a network file server.

In this disclosure, there are shown and described only the preferred embodiments of the invention, but it is to be understood that the invention is capable of changes and modifications within the scope of the inventive concept as expressed herein.

What is claimed is:

1. A data communications device coupled to a system memory, comprising:
   a receive buffer memory for temporarily storing receive data supplied from a communications network for transferring to the system memory,
   a transmit buffer memory for temporarily storing transmit data retrieved from the system memory for transmitting to the communications network,
   a memory management unit coupled to said receive and transmit buffer memories for managing transmit data transfers from the system memory to the transmit buffer memory and receive data transfers from the receive buffer memory to the system memory, and
   an arbitration circuit responsive to access requests for arbitrating access to said system memory,
   said memory management unit being configured for storing transmit data transfer control values for limiting the number of transmit data transfers in one period of access to said system memory granted by said arbitration circuit.

2. The device of claim 1, wherein said transmit data transfer control values are dynamically programmed in accordance with data traffic.

3. The device of claim 1, wherein said transmit data transfer control values are preprogrammed in accordance with an application of said data communications device.

4. The device of claim 1, wherein said transmit data transfer control values include a transmit transfer maximum value that limits the maximum number of transmit data transfers in one period of access to said system memory.

5. The device of claim 4, wherein said transmit data transfer control values further include a transmit transfer limit value that limits the number of transmit data transfers in one period of access to said system memory, when access to said system memory is also requested for providing the receive data transfers.

6. The device of claims 1, wherein said system memory is coupled to said receive and transmit buffer memories via a bus.

7. The device of claim 6, wherein said arbitration circuit arbitrates access to said bus.

8. The device of claim 6, wherein said bus includes a peripheral component interconnect (PCI) bus for providing transmit data transfers and receive data transfers between said system memory and said transmit and receive buffer memories.

9. The device of claim 1, wherein said access requests include a transmit data request to read transmit data from said system memory to said transmit buffer memory.

10. The device of claim 9, wherein said access requests further include a receive data request to write receive data from said receive buffer memory to said system memory.

11. The device of claim 10, wherein said receive data request has priority over said transmit data request when said arbitration circuit provides access arbitration immediately after reset of said data communications device.

12. The device of claim 10, wherein said transmit data request has priority over said receive data request if last access to said system memory was performed to write the receive data.

13. The device of claim 12, wherein said receive data request has priority over said transmit data request if last access to said system memory was performed to read the transmit data.

14. The device of claim 10, wherein said access requests further include a receive descriptor request to read a receive descriptor from said system memory, and a transmit descriptor request to read a transmit descriptor from said system memory.

15. The device of claim 14, wherein said access requests further include a receive status request and a transmit status request to write receive status information and transmit status information, respectively, to said system memory.

16. The device of claim 15, wherein said receive descriptor request has highest priority when said arbitration circuit provides access arbitration.

17. The device of claim 16, wherein said transmit descriptor request has next priority after said receive descriptor request.

18. A data communications device coupled to a system memory, comprising:
   a receive buffer memory for temporarily storing receive data supplied from a communications network for transferring to the system memory,
   a transmit buffer memory for temporarily storing transmit data retrieved from the system memory for transmitting to the communications network,
   a memory management unit coupled to said receive and transmit buffer memories for managing transmit data transfers from the system memory to the transmit buffer memory and receive data transfers from the receive buffer memory to the system memory, and
   an arbitration circuit responsive to access requests for arbitrating access to said system memory,
   said memory management unit being configured for storing receive data transfer control values for limiting the number of receive data transfers in one period of access to said system memory granted by said arbitration circuit.

19. The device of claim 18, wherein said receive data transfer control values are dynamically programmed in accordance with data traffic.

20. The device of claim 18, wherein said receive data transfer control values are preprogrammed in accordance with an application of said data communications device.

21. The device of claim 18, wherein said receive data transfer control values include a receive transfer maximum value that limits the maximum number of receive data transfers in one period of access to said system memory.

22. The device of claim 21, wherein said receive data transfer control values further include a receive transfer limit value that limits the number of receive data transfers in one period of access to said system memory, when access to said system memory is also requested for providing the transmit data transfers.

23. In a data communications device coupled to a system memory via a bus and having transmit and receive buffer memories, a method of arbitrating access to said bus comprising the steps of:

providing a transmit data request to access said bus for reading transmit data from the system memory to the transmit buffer memory, providing a receive data request to access said bus for writing receive data from the receive buffer memory to the system memory, providing arbitration between the transmit data request and the receive data request in accordance with a priority scheme, and programming transmit transfer control values for limiting the number of transmit data transfers allowed in one period of access to said bus.

24. The method of claim 23, further comprising a step of programming receive transfer control values for limiting the number of receive data transfers allowed in one period of access to said bus.

* * * * *